United States Patent
Chen

(10) Patent No.: US 7,140,548 B2
(45) Date of Patent: Nov. 28, 2006

(54) MEMORY CARD STRUCTURE

(75) Inventor: Chien-Yuan Chen, 5F-1, No. 8. Sec. 3, Shuangsh Rd., Banchiau City, Taipei (TW) 220

(73) Assignees: Power Digital Card Co., Ltd., Taipei (TW); Chien-Yuan Chen, Taipei (TW)

( * ) Notice: Subject to any disclaimer, the term of this patent is extended or adjusted under 35 U.S.C. 154(b) by 0 days.

(21) Appl. No.: 10/766,829

(22) Filed: Jan. 30, 2004

(65) Prior Publication Data

US 2005/0167511 A1    Aug. 4, 2005

(51) Int. Cl.
*G06K 19/06* (2006.01)
*G06K 19/00* (2006.01)

(52) U.S. Cl. ...................... 235/492; 235/487
(58) Field of Classification Search ................ 235/492, 235/441, 487; 361/736, 737, 752, 800
See application file for complete search history.

(56) References Cited

U.S. PATENT DOCUMENTS

| | | | | |
|---|---|---|---|---|
| 4,565,922 A | * | 1/1986 | Anderson | 235/492 |
| 5,784,259 A | * | 7/1998 | Asakura | 361/752 |
| 5,995,372 A | * | 11/1999 | Asakura | 361/737 |
| 6,410,355 B1 | * | 6/2002 | Wallace | 438/15 |

* cited by examiner

*Primary Examiner*—Thien M. Le
*Assistant Examiner*—April Taylor
(74) *Attorney, Agent, or Firm*—Troxell Law Office, PLLC

(57) ABSTRACT

A structure of a memory card, consisting of a circuit board and a case, the size of the case is a little smaller than that of the circuit. A space formed between the case and the circuit. A contact terminal is disposed on one end of the circuit board with exposure which is not covered by the case, by which it can accomplish the purpose of chipping the memory card. Besides, the contact terminal can be made by way of SMT so as to increase the rate of desirable production and shorten the time of promote signal conducting efficiency.

1 Claim, 1 Drawing Sheet

MEMORY CARD STRUCTURE

BACKGROUND OF THE INTENTION a) Field of the Invention

The invention relates to a memory card structure, especially to a memory card of a circuit board replacing the lower case.

b) Description of the Prior Art

Traditional memory cards mainly consist of a case and a circuit board such as "Improved Structure of PC Memory Card Case" (Taiwan Utility Patent Publication No. 233068), "Integrated Refined Structure for Memory Card" (Taiwan Utility Patent Publication No. 481311), and a "New Structure for Memory Card Case" (Taiwan Utility Patent Publication No. 504063), etc. These previous patents merely illustrate different structure of the case by composing either an upper case and a lower case made of plastic materials, or an upper case and lower case made of a plastic frame combined with metal materials, or a metal board each disposed on both upper and lower side of the circuit board within a plastic case. However, the aforesaid still belong to a traditional structure of a case covering a circuit board. As shown on FIG. 1, the thickness t1 of a normal upper case 10 is about 1.1 mm the thickness t2 of the circuit board 20 is about 1 mm, and the thickness t3 of the lower case 30 is about 0.7 mm. Since the thickness of the traditional case structure cannot be shortened, the cost of materials cannot be decreased. Another serious defect is: due to the limited space of the case, the circuit board has to be made of special electronic parts, especially IC with bigger volume and in higher length, which also result in the cost not being decreased. Furthermore, the traditional way to make the contact terminal 21 on the circuit board 20, called "Gold Finger", is limited to its space and thickness, which has to be produced by way of Wafer (Die), is considered as having much difficulty in technique, high rate of failure and time consuming in production.

SUMMARY OF THE INVENTION

In consideration of the defects of the conventional techniques, the major purpose of the present invention is to provide a memory card structure, which consists of a circuit board and a case, with a little smaller size than that of the circuit. There is a space formed between the case and the circuit board. A contact terminal is disposed on one end of the circuit board with exposure which is not covered by the case thereby accomplishing the purpose of chipping the memory card. Besides, the contact terminal can be manufactured by way of Surface mounting Technology (SMT) so as to increase the rate of desirable production and shorten the time of production.

A further purpose of the invention is to provide a memory card structure, with both sides of the circuit board configured with a contact terminal so as to enlarge the conducting square measure as well as to promote the conducting efficiency.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 2:
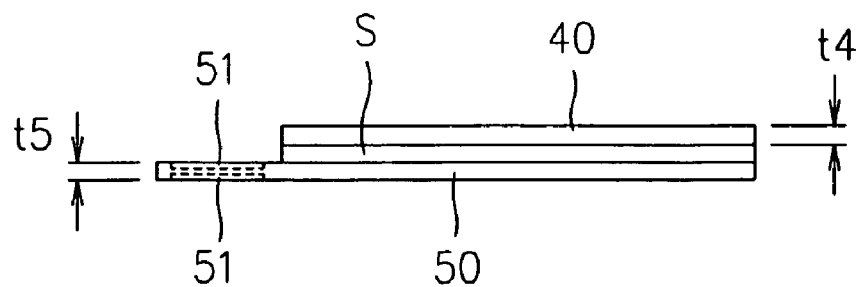
FIG. 2 is the structural plan view of the invention.

Referring to FIG. 2, the memory card structure of the invention consists of a case 40 and a circuit board 50. A space S is formed for containing electronic parts between case 40 and circuit board 50. The size of the case 40 is a little smaller than circuit board 50. A contact terminal 51 (is called "Gold Finger") is disposed on one end of the circuit board 50 with exposure which is not covered by the case 40.

Figure 1:
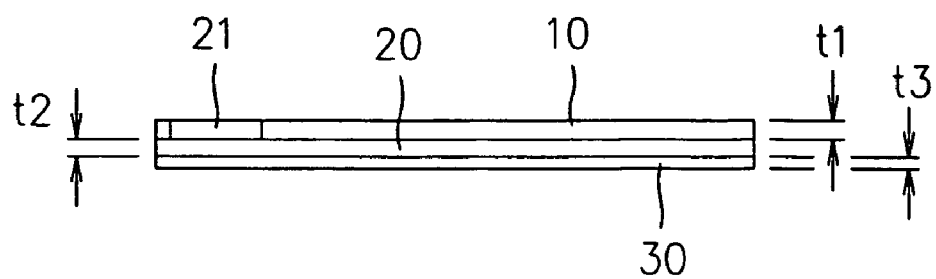
FIG. 1 is structural plan view of the traditional memory card.

The thickness t4 of the case 40 is made about 1.1 mm traditionally, while the thickness t5 of the circuit board 50 is made about 1 mm. In comparison with the traditional structure as shown in FIG. 1, the space S of the invention being made 0.7 mm. In other words, with the structure of the invention, there is still 0.7 mm more space for containing the electronic parts on the circuit board 50. Thus, the electronic parts with thicker thickness and lower cost can be adopted. Besides, due to the contact terminal 51 is disposed outside of the case 40, manufacturing by surface mounting technology (SMT) can be adopted, which can promote the rate of successful production as well as to shorten the production time. Furthermore, on both sides of the circuit board 50 can be disposed with the contact terminal 51 so as to enlarge conducting square measure and to promote signal conducting efficiency.

In additional, the bottom side of the circuit board of the traditional memory card is not considered to be an available square measure for use originally, that is, the bottom side of the circuit board is not designed to configure any electronic parts. Therefore, the way to replace the traditional lower case with a circuit board of the invention is not considered to decrease the available square measure of the circuit board, but can save costs from installing the lower case and enhance using of the circuit board.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A memory card structure comprising:
    a) a circuit board having at least two contact terminals including a first contact terminal located on a top of a first end thereof and a second contact terminal located on a bottom of the first end thereof; and
    b) a case located above and spaced apart from the top of the circuit board, the first contact terminal is located on the top of the circuit board between the case and the first end of the circuit board, the case having a size smaller than a size of the circuit board, a space being formed between the case and the circuit board, an end of the case being spaced apart from the first end of the circuit board a distance greater than a length of the at least two contact terminals.

\* \* \* \* \*